United States Patent [19]
Holbrooks et al.

[11] Patent Number: 5,161,640
[45] Date of Patent: Nov. 10, 1992

[54] MECHANIC'S LIFT

[75] Inventors: Orville R. Holbrooks; Linda J. Holbrooks, both of 5304 Seabreeze Way, Oxnard, Calif. 93035

[73] Assignees: Orville R. Holbrooks; Linda J. Holbrooks, Thousand Oaks, Calif.

[21] Appl. No.: 813,251

[22] Filed: Dec. 24, 1991

[51] Int. Cl.⁵ .................................................. B60R 3/00
[52] U.S. Cl. ........................................ 182/92; 182/82; 182/113; 182/222; 280/165
[58] Field of Search .................. 182/92, 82, 129, 113, 182/184, 150, 222, 179; 280/165

[56] References Cited

U.S. PATENT DOCUMENTS

| | | |
|---|---|---|
| 2,575,503 | 11/1951 | Warren . |
| 2,679,436 | 5/1954 | Viebrock . |
| 2,772,720 | 12/1956 | Zody . |
| 2,851,312 | 9/1958 | Hoff . |
| 2,957,541 | 10/1960 | Everest . |
| 3,058,542 | 10/1962 | Rogalla . |
| 4,034,829 | 7/1977 | Hoffman ............................ 182/113 |
| 4,550,802 | 11/1985 | Roper ................................ 182/113 |
| 4,782,916 | 11/1988 | Hays .................................. 182/92 |
| 4,800,987 | 1/1989 | Liles ................................... 182/92 |
| 4,934,486 | 6/1990 | Butler . |
| 4,947,961 | 8/1990 | Dudley ............................... 182/92 |

Primary Examiner—Reinaldo P. Machado
Attorney, Agent, or Firm—Michael J. Ram

[57] ABSTRACT

A work station for mounting to the side of a vehicle to aid a mechainc in reaching the engine compartment comprising a platform surface, four legs movably attached to the platform so that the height of the platform is adjustable, a brace attached to the platform to space the platform away from the side of the vehicle, and mounting means for attaching the platform to the side of the vehicle so that the platform does not move during use.

13 Claims, 2 Drawing Sheets

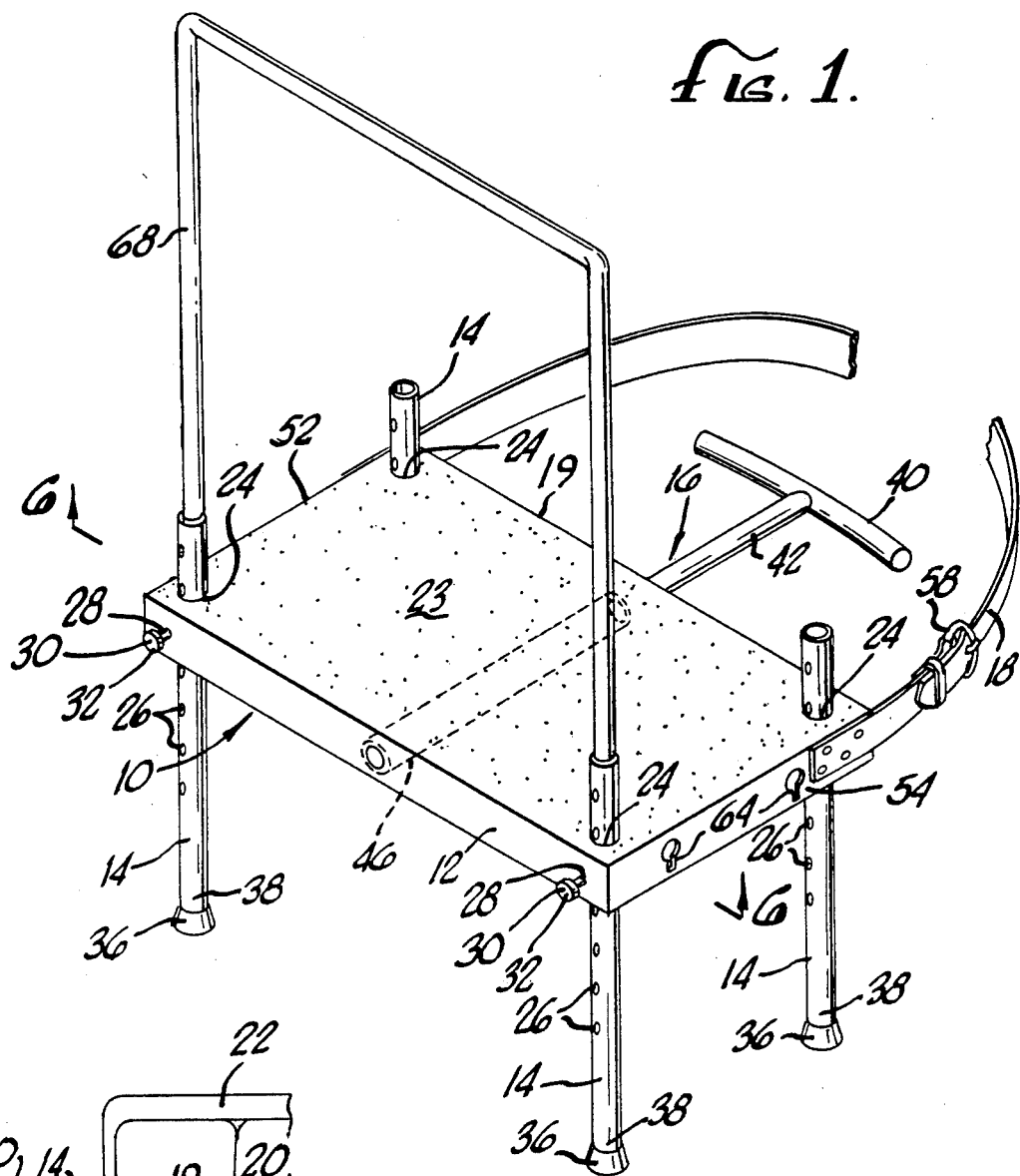
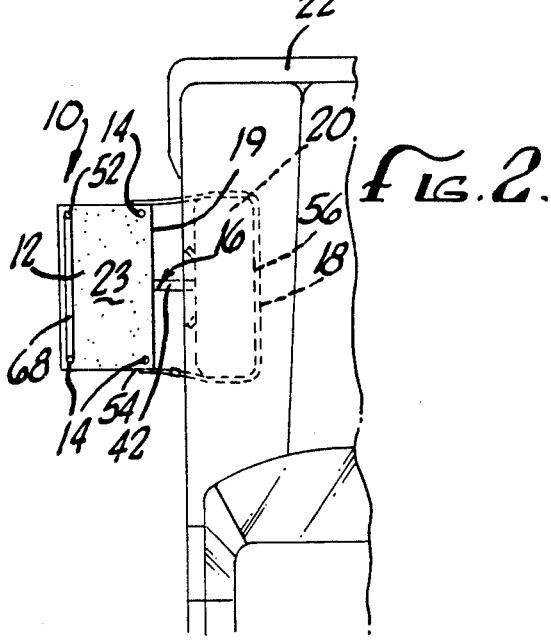
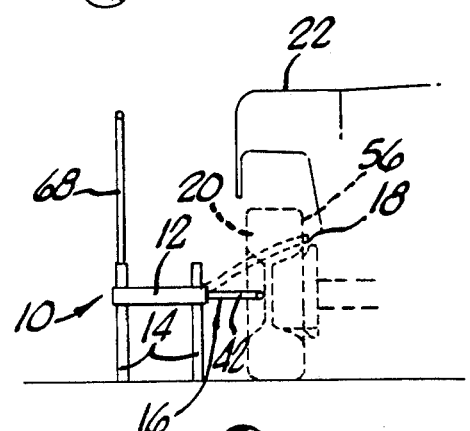

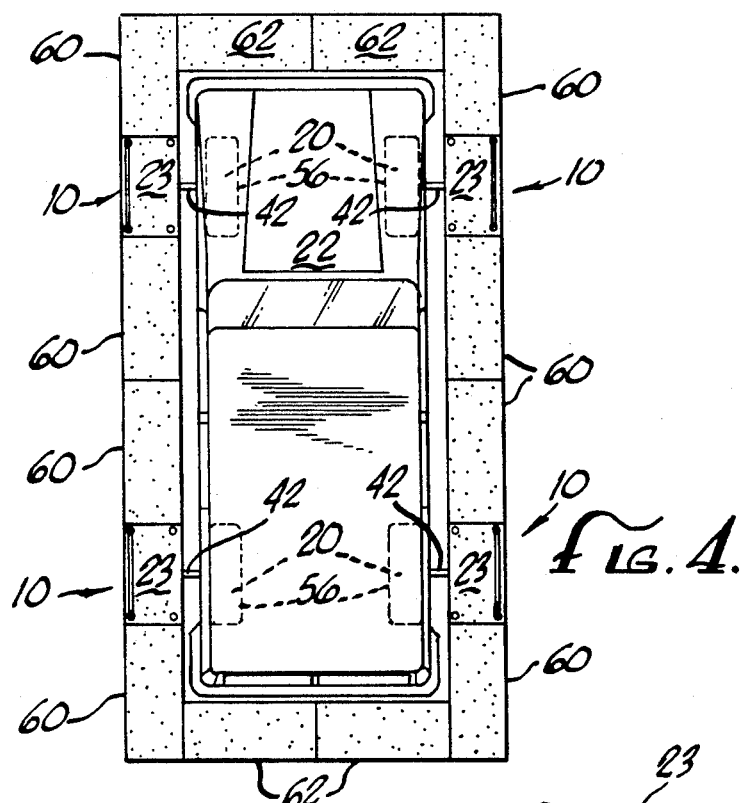
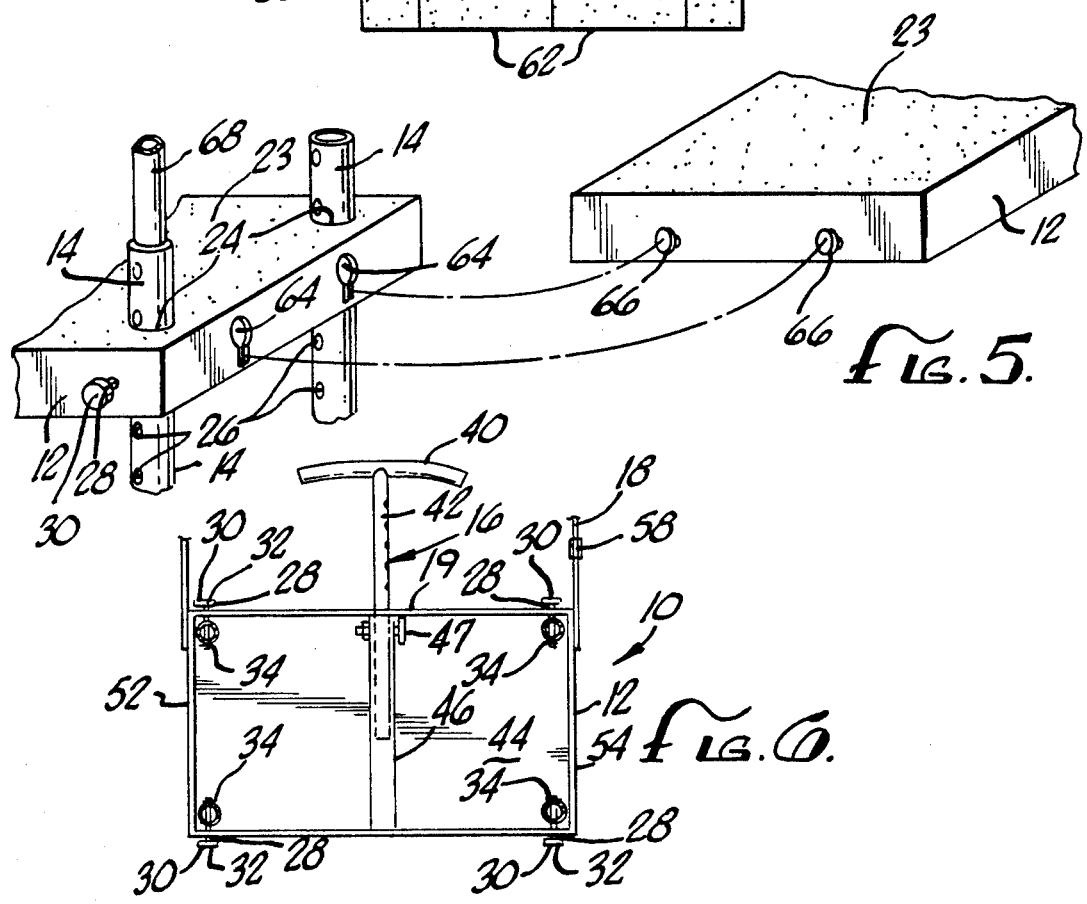

MECHANIC'S LIFT

BACKGROUND

The present invention relates to a work station for use in servicing motor vehicles.

Because of the height above the ground and the width of the engine compartment, automobile mechanics have had difficulties in reaching into the engine compartment of the motor vehicles without the mechanic's feet sliding on the surrounding ground surface. This is a particular problem with four wheel drive vehicles or trucks which have larger tires than automobiles, thus raising the engine compartment and surrounding vehicle body structure higher above the ground. These larger tires make it exceptionally difficult to reach into all portions of the engine compartment.

The primary approach to solve this problem has been to assemble makeshift platforms from milk cases, step ladders or other light, moveable structures. However, these structures are difficult to stabilize and maintain in a fixed position adjacent the vehicle. As a result, these structures tend to slide out from under the feet of the mechanics and can thus result in severe injuries to the user and damage to the vehicle exterior.

Several patents have issued covering structures for mounting alongside the vehicle. Structures are hung on the side of the vehicle (U.S. Pat. No. 2,957,541) while others are attached to a tire on the vehicle (U.S. Pat. Nos. 2,575,503, 2,679,436, 2,851,312, and 4,934,486). However, these devices are not adequately adjustable in height, may damage the finish on the vehicle, or are not adequately stabilized to prevent injury to the mechanics while they are working.

Thus, there is a need for a stable platform for mounting next to a vehicle which is adjustable in height, stable under normal use conditions and is adequately spaced from the side of the vehicle so that the finish on the vehicle will not be marred during repair procedures.

SUMMARY

These needs are met by the mechanic's work station of the present invention.

The mechanic's work station of the present invention comprises a platform having adjustable height legs, means to securely attach the work station to a tire on the vehicle, and a brace adjustably positioned against the hub of the vehicle tire to stabilize the platform a fixed distance from the side of the vehicle, the brace and attaching means cooperating to stabilize the platform in a desired position along side the vehicle.

In a specific embodiment of the work station, the means to secure the platform to the tire is a band of adjustable length and the brace is a T-shaped extension, both the brace and band being located on the same side of the platform. The band can be placed over the tire so that a portion of the band is on the side of the tire away from the platform. The brace rests against the hub of the tire so that the platform is kept spaced from the side of the vehicle when the platform is secured to the vehicle by tightening the band. For the safety of the mechanic, the platform can be electrically isolated by using nonconductive materials or placing a non-conductive covering at all points where the work station contacts the ground or the vehicle.

The band is preferably composed of a strap with a buckle or a chain with tightening means.

The mechanic's work station includes provisions for readily attaching additional platforms at either side so that an assembly can be constructed to partially or totally surround the vehicle. This assembly, which allows more than one mechanic to have access to the engine compartment at a time, is particularly beneficial when major engine work is being pursued. Additionally, the assembly allows body work and other maintenance functions besides engine work to be accomplished.

DRAWINGS

These and other features, aspects, and advantages of the present invention will become better understood from the following description, appended claims, and accompanying drawings where:

FIG. 1 is a perspective view of the mechanic's work station embodying features of the invention;

FIG. 2 is a top view of the mechanic's work station of FIG. 1 mounted to a vehicle tire;

FIG. 3 is a side view of the mechanic's work station of FIG. 1 mounted to a vehicle tire;

FIG. 4 is a top view of several mechanic's work stations of FIG. 1 joined together with other work stations to form an assembly completely surrounding a vehicle;

FIG. 5 is a perspective view showing the assembly means on the side of adjacent platforms for use in joining two platforms together; and FIG. 6 is a bottom view of the mechanic's work station of FIG. 1.

DESCRIPTION

FIGS. 1 through 3 show a version of the mechanic's work station 10 embodying features of the present invention.

The mechanic's work station 10 comprises a platform 12 having four legs 14 adjustable as to height, a brace 16 and a band 18 for securing the platform 12 to the tire 20 of a vehicle 22 to be serviced, the brace 16 and the band 18 both being located on the vehicle side 19 of the platform 12.

The platform 12 shown in the Figures has a flat rectangular upper surface 23, the upper surface preferably formed from or coated with a non-slip material so the mechanic's feet will have good traction. This is of particular concern because the work environment frequently includes spilled oils and other slippery liquids which may create a hazardous working condition. Suitable non-slip construction includes an open metal grating, raised roughened surfaces or a non-skid coating applied to upper surface 23. The platform can be constructed of a wide range of load bearing materials. Preferred materials include structural metal, such as steel, aluminum or reinforced polymeric materials which can support at least two workmen, their work tools and the engine components or replacement parts being serviced.

Legs 14, of either solid or hollow construction, are positioned at least in the four corners of the platform 12. While the legs 14 can be mounted to the exterior surface of the platform 12, the method for attachment shown consists of positioning holes 24 spaced internal of the edge of the platform, the positioning holes 24 being sized for placement of the legs 14 therethrough. To adjust the height of the platform 12 above the floor, each leg 14 has a series of mounting holes 26 perpendicular to and intersecting the center line of the leg 14, the mounting holes 26 being uniformly spaced along the length of the legs 14. The platform 12, at the location of each of the positioning holes 24, has a locator hole 28, the axis of each of the locator holes 28 being perpendicular to and intersecting the axis of the adjacent positioning hole 24. The leg 14 is placed in a positioning hole 24, the desired mounting hole 26 is positioned in line with the locator hole 28 and a pin 30 is placed through both the mounting hole 26 and the positioning hole 28, thus securing the leg in place. The pin can have a head 32 on one end and securing means 34, such as a cotter pin, nut or other temporary locking mechanism on the opposite end to prevent the pin 30 from accidentally being removed from its desired location in the mounting and locator holes 26 and 28

The materials used to construct the platform 12 are also suitable materials for fabricating the legs 14. While the cross section of the legs 14 shown in the Figures is circular, the geometric shape of the cross section of the legs 14 is not critical to the proper functioning of the structure. Alternate cross sections include triangular, square, rectangular or a broad range of other geometric shapes. In order to electrically isolate the platform, feet 36 of an insulating material, such as rubber, can be placed on the lower end 38 of each leg 14 if the leg 14 is not fabricated from a non-conductive material.

The brace 16 comprises a T-shaped one piece structure having a bearing surface 40 positioned perpendicular to a mounting shaft 42 such that the bearing surface corresponds to the top of the T and the shaft corresponds to the upright of the T. Depending from the lower surface 44 of the platform 12, or located within the platform 12, are means for mounting the brace 16 to the platform 12 with the bearing surface 40 placed along the vehicle side 19 of the platform. Suitable mounting means are yokes (not shown) or a cylindrical hole 46 sized to receive the shaft 42. Positioning means 47 similar to that used to position the legs 14 in the platform 12, or other adjustable locking means, such as set screws, locking collars or other means commonly used to hold a shaft in a fixed position in a hole, can be used to position the brace 16 in its desired location. The length of the bearing surface is chosen so that it is approximately the same as the width of a tire rim at a point between the wheel axle and the edge of the tire rim. In this manner, when the platform is positioned next to a vehicle the bearing surface will rest only against the rim and not against the tire 20. Additionally, the bearing surface 42 is shown as an arc curved towards the base of the T. This aids in placing the brace 16 against the rim rather than the tire 20, rim mounting being more stable then mounting against the tire. However, the utility of the work station will not be severely effected if the bearing surface 40 is straight rather than curved or its length causes it to rests against the tire 20 when the platform is positioned next to the vehicle 22. Electrical isolation of the work station is maintained by fabricating at least the bearing surface 42 of a non-conductive material or coating the bearing surface with a material with electrical insulating properties.

The work station 10 is held in place, so that it will not move when a person is standing on the platform 12, by a band 18 attached either to the vehicle side 19 of the platform 12 or the left and right sides 52 and 54 adjacent thereto. The band 18 is composed of a flexible material which can be readily placed over the top of the tire 20 and positioned along the back surface 56 of the tire 20. Suitable materials for fabricating the band 18 include leather straps, belts of braided or woven cloth or plastic fibers, chains assembled from metal or plastic links, or other similar materials which can be tensioned without stretching or breaking. If electric isolation of the work station is to be maintained, a chain with all links being metal should not be used. A preferred length for the band 18 is from about 90 to about 160 inches, the length being dependent on the size of the tires on the vehicle.

In order to position the platform and hold it fixed in the desired position an adjustment mechanism 58, such as a two part buckle, latching mechanism, hook and eye arrangement or other common strap tensioning mechanisms, is used to vary the effective length of the band 18. Several different arrangements are possible for mounting the band 18 and the adjustment mechanism 58. For example, the band 18 can be made in two pieces with one end of each piece being attached to the platform and the other end of each piece of the band 18 having half of the adjustment mechanism 58 attached thereto. The pieces of the adjustment mechanism 58 can then be interlocked to obtain the desired band length. Alternatively, a single band 18 with each end of the band attached to the platform 12, is used and a tensioning device is placed on the band 18. As a third alternative one end of the band is attached to the platform 12, a portion of the adjustment mechanism 58 is connected to the free end of the band 18 and the other portion of the adjustment mechanism is attached to the platform at a position where the two portions can be connected.

To use the mechanic's work station 10, it is assembled and placed along side a tire 20 of the vehicle 22 to be serviced with the vehicle side 19 of the platform facing the tire 20 and the legs 12 are adjusted to the desired height by properly locating the pins 30 in the mounting and locator holes 26 and 28. The vehicle side 19 of the platform 12 is spaced from the edge of the vehicle 22 (about 1 to about 5 inches), the bearing surface 40 of the brace 16 is brought against the tire rim by sliding the shaft 42 through the cylinder 46 and the brace 16 is locked in place by setting the positioning means 47. The band 18 is then passed behind the tire but above the axle of the vehicle 22 and the adjustment means 58 is tightened to bring the bearing surface 40 into snug contact with the rim of the tire 20.

FIG. 4 shows several work stations 10, with each work station 10 mounted to a tire of the vehicle. The length of the work stations 10 can be chosen so that when two work stations 10 are mounted to one side of a vehicle they abut each other. However, because the distance between axles in different vehicles may vary, a filler station 60 is placed between the two work stations 10. The filler stations 60 can be constructed in various incremental lengths or can be constructed so that they can be extended to fill the space between the work stations. Additionally, end stations 62 can be added so that a platform structure can be assembled to completely surround the vehicle to be serviced. The end stations 62 can also be of fixed lengths or extendable so that various different width vehicles can be accommodated. Both the filler stations 60 and the end stations 62 are of similar construction to the work stations 10 with the exception that they don't include the brace 16 or the band 18.

While FIG. 4 shows the vehicle completely surrounded by work stations, a partial assembly is more common. A normal assembly might consist of two work stations 10 mounted to the front two tires and one or more filler stations 60 and end stations 62 across the front of the vehicle.

The stability of the assembled structure is improved by connecting the various station together. Suitable connecting means include nut and bolt connectors or interlocking structures on adjacent stations. FIG. 5 shows a key hole slot 64 and button 66 arrangement on the end or side of a work station 10. The end or side of a filler station 60 or end station 62 has matching key hole slot 64 and button 66 structures mounted thereon so that the button 66 on one station can be inserted in the key hole slot 64 on the other station, and vice versa. In this manner, when adjacent platforms 12 are at the same height the key hole slot 64 and button 66 combination hold the stations together in a stable manner.

Various accessories can be added to the work station. FIGS. 1, 3 and 5 show a safety rail 68 mounted to the outer edge of the platform 12 to prevent the mechanic from falling off the platform. Other accessories which may be added are tool or parts holders, electrical outlets or air pressure line connections for the attachment of electrical or air driven tools, mounts for attaching lighting fixtures, or steps to make it easier for the mechanic to mount or dismount from the work station.

Although the present invention has been described in considerable detail with reference to certain preferred versions and uses thereof, other versions and uses are possible. For example various materials of construction may be used and the components may be formed in various different configurations. Also the dimensions of the various platforms can be varied to suit the size of the vehicle being service. Suitable dimensions for the work station 10, the filler stations 60, and the end stations 62 are an adjustable height from about 6 inches to about 24 inches and platform 12 dimensions from about 16 to 20 inches in width by about 26 to 30 inches in length, the longer length running along the length of the vehicle. In order to accommodate longer vehicles or to simplify assembling structures to give extended access to the engine compartment longer work stations, filler stations and end stations can be constructed. Suitable alternate lengths for the longer work stations are about 44 inches and about 68 inches. Therefore, the spirit and scope of the appended claims should not be limited to the description of the preferred versions contained herein.

What is claimed is:

1. A mechanic's work station for use in servicing vehicles comprising:
   (a) a platform for placement on a support surface next to a vehicle, the platform having a flat upper surface and multiple legs adjustably attached for movement perpendicular to the platform upper surface, the vertical distance of the upper surface from the support surface being varied by changing the location on each leg where attachment is made to the platform,
   (b) a mounting means for securing the platform adjacent the side of the vehicle, the mounting means having a first end and a second end, both the first end and the second end being attached to the platform at spaced apart locations, the mounting means being adjustable in length and being sized and positioned so that a portion of the mounting means can be placed behind a tire on the vehicle when the platform is positioned adjacent the same tire, and
   (c) a T-shaped brace comprising a mounting shaft and a bearing surface attached perpendicular to the mounting shaft, the mounting shaft corresponding to the upright of a T and the bearing surface corresponding to the top of a T, the brace being adjustably mounted below the platform upper surface such that the bearing surface is positioned between the platform and the tire when a portion of the mounting means is placed behind the tire, the brace being further positioned so that the bearing surface is brought to rest against the tire when the length of the mounting means is reduced.

2. The mechanic's work station of claim 1 wherein the legs have a series of equally spaced mounting holes, the platform upper surface is rectangular in shape and has at least four positioning holes, one positioning hole being located adjacent each corner of the platform, each positioning hole receiving one of the legs, the platform at the location of each positioning hole having a locator hole therethrough so that the locator hole can be aligned with the mounting hole and a pin can be placed serially through both the locator hole and the mounting hole to fix the position of the leg in the platform.

3. The mechanic's work station of claim 1 wherein the platform has a non-slip upper surface.

4. The mechanic's work station of claim 1 wherein the mounting means comprises a band chosen from the group consisting of a strap, a woven or braided belt formed from cloth or plastic fibers, and a chain having metal or plastic links, the band having means attached thereto to vary the effective length of the band.

5. The mechanic's work station of claim 4 wherein the means attached thereto to vary the effective length of the band is chosen from the group consisting of a buckle, latching mechanism, hook and eye arrangement and strap tensioning devices.

6. The mechanic's work station of claim 1 wherein the work station is electrically insulated from the vehicle and the support surface.

7. The mechanic's work station of claim 1 wherein the bearing surface is curved toward the mounting shaft.

8. A personnel support stand comprising:
   (a) a platform with a flat upper surface,
   (b) at least four legs, each leg having an attachment portion adjacent one end of the leg and a foot at the other end of the leg, the attachment portion of each leg connected to the stand so that the leg is perpendicular to the platform upper surface,
   (c) mounting means for securing the platform adjacent a structure, the mounting means encircling at least a portion of the structure, and
   (d) a brace mounted to the stand parallel to the platform upper surface to space the stand from the structure when the stand is secured to the structure by the mounting means,
   the connection between the attachment portion of each leg and stand including adjustment means to allow each leg to be moved perpendicular to the platform surface.

9. The personnel support stand of claim 6 wherein the location of each foot in relation to the platform upper surface can be fixed at one of several preselected distances.

10. The personnel support stand of claim 6 wherein each leg has a number of mounting holes, the distance between the mounting holes on one leg being the same as the distance between the mounting holes on the other legs.

11. The personnel support stand of claim 6 wherein the mounting means is an adjustable band attached to the stand.

12. The personnel support stand of claim 6 wherein the mounting means and the brace cooperate to stabilize the support stand, the brace resting against the structure while the mounting means encircles at least a portion of the structure.

13. A work stand for placement on a flat support surface adjacent a wheeled vehicle comprising:
 (a) a platform having a non-slip upper surface,
 (b) at least four legs attached to the platform, the attachment allowing controlled movement of the legs perpendicular to the platform,
 (c) an extendable brace having a bearing surface on one end thereof, the brace being attached to the platform, the attachment allowing controlled movement of the brace parallel to the platform surface so that the bearing surface can be moved beyond an edge of the platform and brought into contact with a first surface of the wheel mounted on the vehicle, the edge of the platform being spaced from the vehicle, and
 (d) a band adjustable in length attached to the platform at two points, the band extending from the platform in the same direction as the bearing surface of the brace, the band being sized to be placed over the wheel on the vehicle, such that when the brace is extended and the bearing surface is brought into contact with a first surface of the wheel of the vehicle, the band is placed over the wheel, and the length of the band is shortened the brace and band cooperate to prevent the work stand from moving.

* * * * *